United States Patent
Du et al.

(10) Patent No.: US 10,140,886 B2
(45) Date of Patent: Nov. 27, 2018

(54) AUTOMATED ASSESSMENT AND GRADING OF COMPUTERIZED ALGORITHMS

(71) Applicant: Data Science Evangelists, Inc., Brooklyn, NY (US)

(72) Inventors: Alan Du, Gaithersburg, MD (US); Ariel Mndange-Pfupfu, Washington, DC (US); Christian Moscardi, New York, NY (US); Tianhui Li, Brooklyn, NY (US)

(73) Assignee: DATA SCIENCE EVANGELISTS, INC., Brooklyn, NY (US)

(*) Notice: Subject to any disclaimer, the term of this patent is extended or adjusted under 35 U.S.C. 154(b) by 248 days.

(21) Appl. No.: 15/078,708

(22) Filed: Mar. 23, 2016

(65) Prior Publication Data
US 2017/0278421 A1 Sep. 28, 2017

(51) Int. Cl.
*G09B 19/00* (2006.01)
*G06F 9/455* (2018.01)
*G09B 7/02* (2006.01)
*G06F 8/41* (2018.01)
*G06F 8/30* (2018.01)
(Continued)

(52) U.S. Cl.
CPC ..... *G09B 19/0053* (2013.01); *G06F 9/45504* (2013.01); *G09B 7/02* (2013.01); *G06F 8/31* (2013.01); *G06F 8/41* (2013.01); *G06F 8/43* (2013.01); *G06F 8/71* (2013.01); *G06F 9/445* (2013.01)

(58) Field of Classification Search
CPC ....... G09B 7/00; G09B 19/00; G09B 19/0053
See application file for complete search history.

(56) References Cited

U.S. PATENT DOCUMENTS 6,002,869 A * 12/1999 Hinckley ............ G06F 11/3696
714/35
8,465,288 B1 * 6/2013 Roers ....................... G09B 7/08
434/118
(Continued)

FOREIGN PATENT DOCUMENTS

WO 2015106103 A1 7/2015

OTHER PUBLICATIONS

Schwartz, M., "Owl (Online Web-Based Learning)", Instructional Technology @ UMB, URL: http://blogs.umb.edu/mariettaschwartz/2008/12/08/owl-online-web-based-learning/, Copyright 2013, University of Mass, Boston.
(Continued)

*Primary Examiner* — James S McClellan
(74) *Attorney, Agent, or Firm* — M&B IP Analysts, LLC

(57) ABSTRACT

A grading system and method for grading a user solution to a computing assignment are presented. The method includes receiving a program code submitted by a user, wherein the received program code is the user solution to the computing assignment; activating at least one code processing engine, wherein each code processing engine is a secured isolated execution environment; executing the program code in the at least one activated code processing engine to produce an answer; determining a grade for the answer based on an expected answer and an approximate grading function, wherein the approximate grading function is determined based on a type of the computing assignment; and returning the grade to the user.

27 Claims, 4 Drawing Sheets

(51) Int. Cl.
   *G06F 9/445*  (2018.01)
   *G06F 8/71*   (2018.01)

(56) References Cited

U.S. PATENT DOCUMENTS

| | | | |
|---|---|---|---|
| 8,472,860 B2* | 6/2013 | Johnson | G09B 7/02 |
| | | | 434/349 |
| 9,117,375 B2 | 8/2015 | Labine et al. | |
| 2003/0028588 A1* | 2/2003 | McConnell | G09B 7/00 |
| | | | 709/203 |
| 2005/0272024 A1 | 12/2005 | Ullman et al. | |
| 2006/0003306 A1 | 1/2006 | McGinley et al. | |
| 2006/0075306 A1* | 4/2006 | Chandrasekaran | ............ |
| | | | G06F 11/3688 |
| | | | 714/47.2 |
| 2006/0160054 A1 | 7/2006 | Onishi et al. | |
| 2006/0257841 A1 | 11/2006 | Mangano | |
| 2007/0172806 A1 | 7/2007 | Stuppy | |
| 2009/0226872 A1 | 9/2009 | Gunther | |
| 2009/0282009 A1 | 11/2009 | Levey et al. | |
| 2009/0291426 A1 | 11/2009 | Polivka | |
| 2013/0224719 A1 | 8/2013 | Allen | |
| 2014/0065593 A1 | 3/2014 | Gannon et al. | |
| 2014/0279763 A1 | 9/2014 | Madnani et al. | |

OTHER PUBLICATIONS

The International Search Report and the Written Opinion for PCT/US2017/023383, ISA/RU, Moscow, Russia, dated Jun. 1, 2017.

\* cited by examiner

AUTOMATED ASSESSMENT AND GRADING OF COMPUTERIZED ALGORITHMS

TECHNICAL FIELD

The present disclosure relates generally to a system and method for automated grading and assessment of technical skills, and more particularly to automated grading and assessment of big data analysis related assignments.

BACKGROUND

Typically, graded assignments or projects allow for evaluating students' performance, providing in-job training, reinforcing learning, and providing feedback to students based on their work. However, creating, administering, and grading effective assignments are very time-consuming tasks for teachers.

In a typical classroom, grading is usually performed without any computing means, which is inaccurate and slow. Certain solutions discussed in the related art suggest automating the process of creating and grading classroom assignments. Such solutions are typically web-based, allowing teachers to reuse information from one assignment to create a new one. The grading is performed based only on definitively correct answers. For example, a multiple choice question or a math question can be evaluated using such solutions because such a question has a single (or more than one) predetermined answer that is right, and/or one or more answers that are predetermined to be wrong. However, such existing web-based solutions cannot evaluate and grade assignments where some or all of the correct answers may not be predetermined. In particular, such solutions cannot properly grade assignments that require programming of software code.

One of the challenges in evaluating such programming assignments is that the answer of an assignment may be correct, but nevertheless may fail to match a predefined answer provided, e.g., by the teacher. That is, a mere comparison of the results would not correctly grade the assignment. For some such assignments, a potentially infinite number of logically equivalent correct answers may be possible.

Moreover, the "answer" for an assignment may be in a form of programming a process or an algorithm that computes a certain task. This would be predominantly the case when training data engineers or scientists. Big data is an interdisciplinary field related to processes for extracting knowledge or insights from structured or unstructured data. Data engineers/scientists use methods from statistics, data mining, predictive analytics, and machine learning to extract knowledge and/or insights from data.

The challenges facing grading of assignments in the field of big data are much more complicated than those for assignments created for a typical classroom. First, there is a broad range of skills to be trained and evaluated. Further, the assignments mainly require algorithms, processes, and programs, such as executable code. The algorithms should be designed to perform specific modeling and analyzing functions for large data sets. As noted above, there could be an infinite number of possible logical ways to design algorithms and, thus, grading can be merely based on the results produced by such algorithms.

Furthermore, algorithms in the field of bid data often provide insights on a specific problem. Insights by their nature are not definitive results. Therefore, the evaluation and grading of assignments relating to the developing and/or programming of such algorithms may be based not only on the correctness of the results, but also on their completeness.

In addition, grading big data algorithms may require execution of their respective codes in a computing environment. Code submitted for grading may be malicious, thereby tampering with the grading program to provide inaccurate grades and/or to harm the execution environment.

Currently, none of the existing solutions, and particularly solutions for grading computer science assignments, are designed to meet all of the above noted challenges. Specifically, the existing solutions for grading computer science assignments cannot efficiently evaluate and grade bid data algorithms in a secured manner.

It would therefore be advantageous to provide a grading solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for grading a user solution to a computing assignment. The method comprises receiving a program code submitted by a user, wherein the received program code is the user solution to the computing assignment; activating at least one code processing engine, wherein each code processing engine is a secured isolated execution environment; executing the program code in the at least one activated code processing engine to produce an answer; determining a grade for the answer based on an expected answer and an approximate grading function, wherein the approximate grading function is determined based on a type of the computing assignment; and returning the grade to the user.

Some embodiments disclosed herein also include grading system for grading a user solution to a computing assignment. The grading system comprises a processing system; and a memory, the memory containing instructions that, when executed by the processing system, configure the processing system to: receive a program code submitted by a user, wherein the received program code is the user solution to the computing assignment; activate at least one code processing engine, wherein each code processing engine is a secured isolated execution environment; execute the program code in the at least one activated code processing engine to produce an answer; determine a grade for the answer based on an expected answer and an approximate grading function, wherein the approximate grading function is determined based on a type of the computing assignment; and return the grade to the user.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
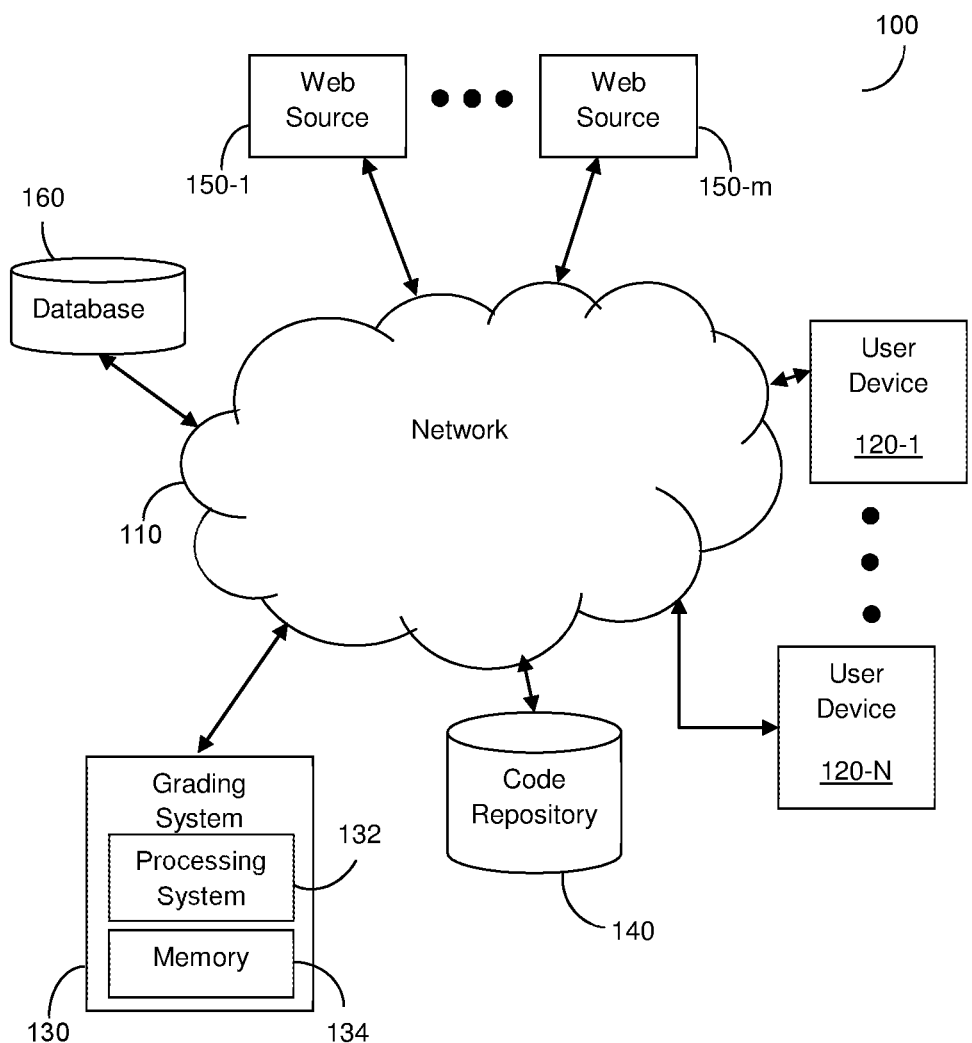
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting network diagram 100 utilized to describe the various disclosed embodiments. A network 110 is communicatively connected to a plurality of user devices 120-1 through 120-n (hereinafter referred to individually as a user device 120 and collectively as user devices 120, merely for simplicity purposes), a grading system 130, and a code repository 140. In certain configurations, a plurality of web sources 150-1 through 150-m (hereinafter referred to individually as a web source 150 and collectively as web sources 150, merely for simplicity purposes) and a database 160 may be connected to the network 110 and may be utilized by the grading system 130. The network 110 may be, but is not limited to, a local area network (LAN), a wide area network (WAN), the worldwide web (WWW), the Internet, a wired network, a wireless network, similar networks, and any combinations thereof.

The user device 120 may be, but is not limited to, a personal computer, a laptop, a tablet computer, a smartphone, and the like. The user device 120 is typically operable by a user who is required to solve predefined assignments. In an embodiment, such a predefined assignment is related to developing and coding big data algorithms. A big data algorithm is designed to provide insights on a specific problem. Insights by their nature are not definitive results. According to an embodiment, the predefined assignments are designed to train and evaluate the user with at least the following skills: machine learning (on structured and unstructured data); data wrangling; distributed computation and Hadoop; distributed computing with Spark® and Scalding tools; extracting, transforming, and loading (ETL); and data visualization. A user is typically a student being trained as a data engineer, a data scientist, a software engineer, and the like.

The web sources 150 include any sources of data that can be accessed in the process of generating an answer to an assignment. The web sources 150 may include, but are not limited to, web servers hosting websites, data warehouses, social media networks, and the like.

The disclosed embodiments for skill assessment are performed by the grading system 130. The grading system 130 is configured to authenticate a user of a user device 120 and to assign an assignment to an authenticated user. The assignment to be assigned can be selected based on the user's level and/or curriculum of the course or class the user participates. In an embodiment, a user of a device 120 is identified and authenticated via cryptographically secure keys to ensure that users cannot read each other's answers and/or the master answers.

Upon assigning an assignment, a grading workplace is created. Creating the grading workplace includes at least allocating storage in the code repository 140, instantiating a secured isolated execution environment for code execution, providing a user interface for writing a program code in a programmable language, and allocating/importing code libraries to allow the program to run seamlessly.

In an embodiment, the secured isolated execution environment for code execution is realized by a virtual machine or a software container. The software container provides a virtualization layer that runs as an application within the operating system. In this approach, the operating system's kernel runs on the hardware node with several isolated guests installed on top of it.

The secured isolated execution environment is utilized only to run the code developed by the user as part of her/his assignment. Such an environment does not run any portions of the code related to grading the assignment. That is, execution of the user's code in the secured isolated execution environment ensures that, even if such code is malicious, it cannot tamper with the grading system, read the reference solutions, and/or impede another user's grading.

In an embodiment, the grading process performed by the grading system 130 is designed to evaluate users' deliverables, which are processes (submitted as program code) designed to implement a big data algorithm. For example, a submitted program code may predict hourly weather in a city for the next 10 days based on historical weather information. One should appreciate that the output of such code cannot be properly compared to a predefined solution set that represents a "correct" prediction. Therefore, the grading performed by the grading system 130 is not based on a pure comparison of a correct answer with the resulting answer (output). To this end, the grading system 130 implements fuzzy logic functions that provide an approximate form of grading. These functions are discussed in more detail below.

In one embodiment, the answers (output datasets) are checked for validity prior to grading. The validity checking may include, for example, ensuring that answers are complete (e.g., for a 10-day hourly prediction, ensuring that predictions were generated every hour over the 10-day period) and in the correct format (e.g., ensuring that the answers belong to the correct data type and/or are physically possible). The validity checking may be performed by both the user device 120 (for faster iteration) and by the grading system 130 (for greater security).

In an embodiment, prior to the grading, the deliverables may be first checked (or lint) for syntactic correctness and an instant response may be sent to a user device 120. To this end, the grading system 130 is configured to capture errors from the interpreter or compiler running the code in the secured execution environment (e.g., the virtual containers) and to return such errors to the respective user device 120. The errors may include, but are not limited to, compilation errors, debugging messages, runtime errors, and the like.

Any program code written by a user to solve a received assignment (or question) is first uploaded from the user device 120 to the code repository 140. In an embodiment, the code repository 140 implements a version control enabling saving of different code versions to the same assignment. This allows for training users to practice version control mechanisms, which is a critical skill for software or data engineers.

In some configurations, the code repository 150 can be embedded in the grading system 130 or a separate component. Examples for the code repository 150 may include, for example, GitHub, Bitbucket, Visual Studio Online, and the like.

The code uploaded to the repository 150 is saved therein and pushed to the grading system 130. The grading system 130, upon receiving the code from the repository 150, is configured to instantiate a secured isolated execution environment, execute the code in the instantiated environment, receive the answer (output) resulting from the execution environment, perform pre-check validation for the output, perform an approximate grading to the code, and report the grades to the user device 120 that submitted the program code. Alternatively or collectively, the reported grades may be delivered via a notification in, e.g., an email to an email address of the person who submitted the assignment. In an embodiment, the grades of each user can be saved in the database 160. The grades can be saved in a structured format together with the respective assignments, answers, user and/or names. The operation of the grading system 130 is discussed in greater detail with respect to FIG. 2.

It should be understood that the embodiments disclosed herein are not limited to the specific architecture illustrated in FIG. 1, and other architectures may be equally used without departing from the scope of the disclosed embodiments. Specifically, the grading system 130 may reside in a cloud computing platform, a datacenter, a single server or multiple servers, and the like. Moreover, in an embodiment, there may be a plurality of grading systems operating as described hereinabove and configured to either have one as a standby, to share the load between them, or to split the functions between them. In a further embodiment, various elements of the grading system 130 may be implemented as stand-alone elements.

The grading system 130 typically includes a processing system or a processing circuitry 132 coupled to a memory 134. The processing system 132 may comprise or be a component of a processor (not shown) or an array of processors coupled to the memory 134. The memory 134 contains instructions that can be executed by the processing system 132. The instructions, when executed by the processing system 132, cause the processing system 132 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 132 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
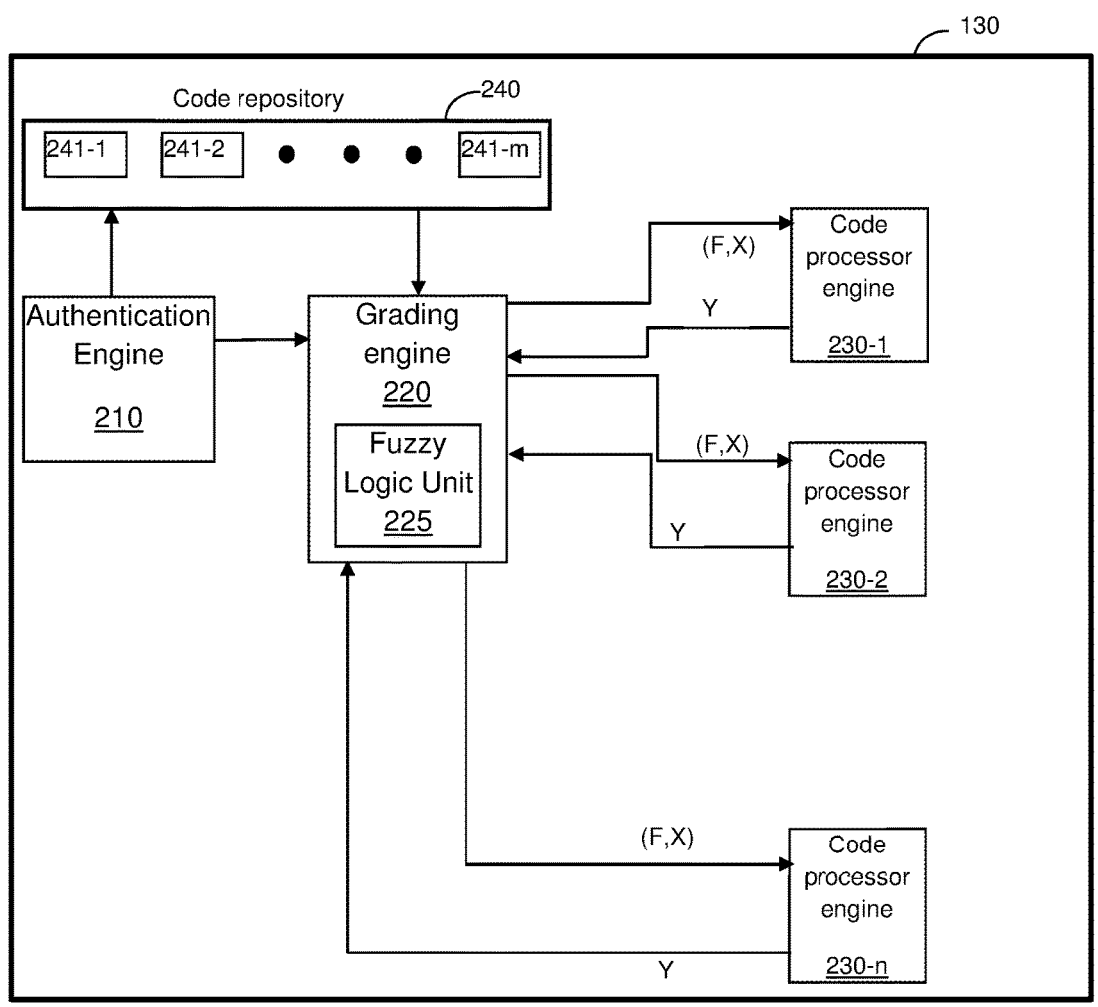
FIG. 2 is a block diagram of a grading system according to one embodiment.

FIG. 2 is an exemplary and non-limiting block diagram of the grading system 130 according to one embodiment. The grading system 130 includes an authentication engine 210, a grading engine 220, a plurality of code processing engines 230-1 through 230-n (hereinafter referred to individually as a code processing engine 230 and collectively as code processing engines 230, merely for simplicity purposes), and a code repository 240. In the embodiment illustrated in FIG. 2, the code repository 240 is part of or embedded in the grading system 130. In the code repository 240, portions of storage 241-1 through 241-m can be allocated to the various users.

In one embodiment, the authentication engine 210 is configured to authenticate any user (accessing through, e.g., a user device 120, FIG. 1) of the grading system 130. The authentication may be based on user login credentials which may include, for example, username, password, biometrics, secured token or key, any combination thereof, and so on. Upon the authentication of a user by the engine 210, the user device of the user is granted access to the grading system 130. The user can access the grading system 130 to receive an assignment to work on and/or to upload the program code which is the user's solution to the assignment to the respective repository. An assignment to be assigned can be retrieved from a database (e.g., the database 160) based on the information of the authenticated user.

Any code uploaded to the repository 240 can be set with a version identifier by a version control mechanism (not shown). The code is then pushed to the grading engine 230, which instantiates a code processing engine 230 for executing the code in a secured isolated execution environment. The code processing engine 230 can be realized as a virtual machine, a software container, and the like. In some configurations, a pool of code processing engines 230 are pre-instantiated, active, and ready to use. By way of example, the program code, representing a solution for an assignment, is uploaded to the repository portion 240-1 and then sent to the code processing engine 230-1.

It should be noted that a plurality of code processing engines 230 can be executed in parallel, and processing engines 230 can be activated or deactivated on demand. Therefore, the grading system can support grading of multiple users at the same time and can scale up or down on-demand.

In an embodiment, the grading engine 220 sends the program code (P) to a code processing engine 230 together with an input data set (X). The user-provided program code (P), when executed by the code processing engine 230, results in an output dataset (Y). The output data set (Y) is the answer sent to the grading engine 220 for evaluation and grading.

In one embodiment, the evaluation and grading is performed respective of an expected answer or dataset (Y', not shown). The expected answer Y' can be saved in the grading engine 220 or can be retrieved from a database. In another embodiment, the grading engine 220 is configured to compute an estimation or prediction function to result in the expected answer Y'. For example, to provide an expected answer for a weather prediction, the grading engine 220 computes a prediction model on the same input dataset (X) provided to the code processing engine 230.

It should be noted that both the grading and code processing engines 220 and 230 can access external web sources (e.g., the web sources 150, FIG. 1) in order to compute the answer (Y) or expected answer (Y'). For example, the code executed by a processing engine 230 can crawl through social media websites to gather information in order to compute an answer Y.

In an embodiment, the grading performed by the grading engine 220 is an approximate grading. To perform the approximate grading, the grading engine 220 is configured with a fuzzy logic unit 225. The fuzzy logic unit 225 is designed to provide a grade or score for the received answer (Y) based on a collection of heuristics (or functions) and the type of algorithm being solved. The grade or score can be at any scale (e.g., 0-1, 1-10, 1-100, etc.).

Following are some non-limiting examples for functions implemented by the fuzzy logic unit 225. When the answer Y and expected answer Y' are lists, the grading is based on the commonality of the elements in the lists and not based on their order. For example, the assignment may be to crawl through a database of all issued US patents and to find the 5 top first names of inventors (i.e., the 5 first names most common among inventors of issued US patents). The results may not be definitive, as in some cases only the first named inventor is mentioned, and in other cases all named inventors are designated. Further, the same name may appear as a different name (e.g., due to typographical errors and/or translation from foreign names to their English counterparts).

By way of example, y={Bob; Smith; John; Robert; Ryan) and y'={John; Bob; Robert; Ryan; Smith}. The grading engine 230 would consider Y to be the correct answer because it includes all elements in the expected answer Y'.

Figure 3:
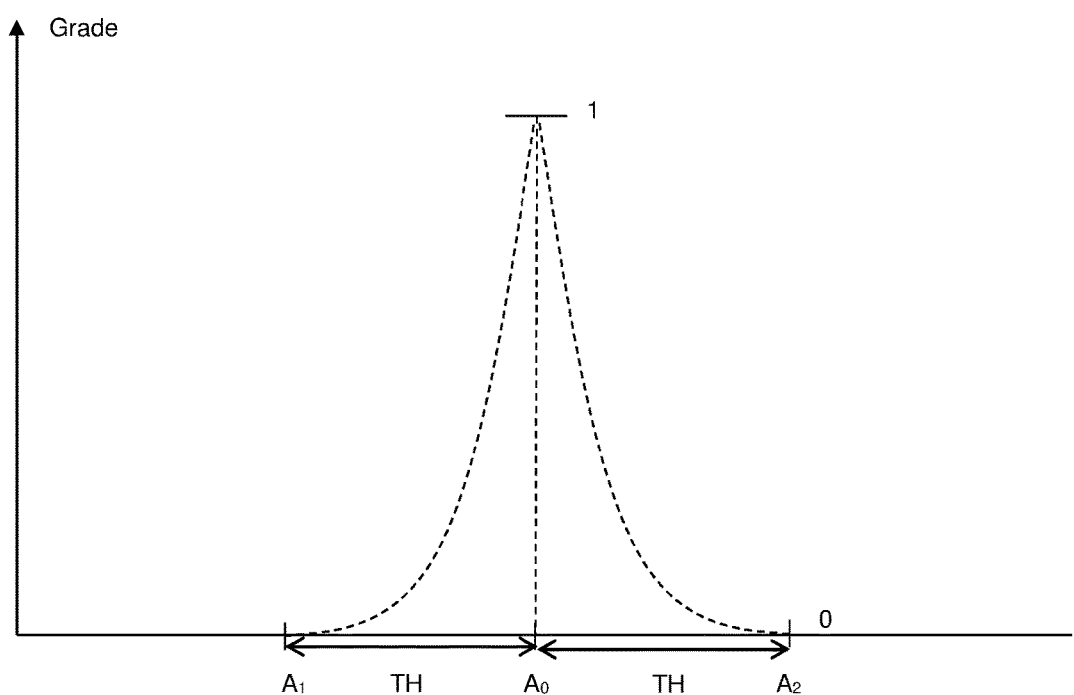
FIG. 3 is a diagram illustrating the forgiveness grading function.

Another example for a function implemented by the fuzzy logic unit 225 is a forgiveness grading function. Here, the grade is decided by a log scale respective of the correct expected answer. As illustrated in FIG. 3, the correct expected answer $A_0$ is assigned with the maximum grade (e.g., 1). A threshold (TH) is defined and each received answer outside of the threshold (i.e., less than $A_1$ or greater than $A_2$) is graded with the minimum grade (e.g., 0). The grades between $A_1$ and $A_0$ and between $A_0$ and $A_2$ are computed using a logarithmic scale. The threshold's value can be predefined based on the type of the assignment.

For example, if the assignment is the number of different first named inventors and the expected answer Y' is 162, then the grade may be 1 when the answer (Y) is 162 and 0.8 when the answer (Y) is 161 or 163. In the example, when the threshold is set to 10% of the expected answer, any answer above 178 or below 146 will receive a grade of 0.

Yet another example for a function implemented by the fuzzy logic unit 225 is a flat tail distribution function. In this example, the expected answer (Y') includes more elements than the answer provided by the users. The grading would be based on the commonality of elements in the two lists. For example, if the expected answer (Y') is a list including 200 elements and the received answer (Y) includes 100 elements, the grade would be maximum if all 100 elements of Y are included in Y'. It should be noted that the different answers of different users may include different elements, but may still receive the maximum grade as long as the elements in the respective lists are fully included in the expected answer list (Y').

For example, if Y'={Smith; John; Robert; Bob; Ryan; Mike; Michael}; $Y_1$={John; Bob; Robert; Smith}; and $Y_2$={Bob; Ryan; Mike; Michael}, both $Y_1$ and $Y_2$ would receive a maximum score.

In another embodiment, the fuzzy logic unit 225 implements a collection of machine learning metrics in order to grade the results answer (Y). Non-limiting examples for such functions include root mean square error (RMSE) for mean errors, hold-out validation, a classification function for classification errors, a recall-and-precision function for IR-models, and the like, or any combination thereof.

Grading of machine learning assignments may be using one or more machine learning metrics and typically requires the grading engine 220 to compute a prediction model as well to grade the answer Y. For example, an assignment may be to train a machine learning model on restaurant reviews that will predict restaurant popularity rating given structured and unstructured properties about a restaurant. To grade the answer of such an assignment, first using a hold-out validation process, the grading engine 220 is configured to estimate how well the resulting model has been trained and to estimate model predictors or classifiers (indicating the predicated rating). Then, the model is tested on the real structured data properties (e.g., city of the restaurant, presence of outdoor seating, cuisine type, etc.) and un-structured data (e.g., free-text review data) and results are compared with the ratings. The structured data properties are sent as the input dataset (X) provided to the code processing engine 230. Expected results Y' provided by a model trained by the grading engine 230 on the input dataset (X) are compared to the received answer (Y). For example, a mean error for each of Y and Y' can be computed and, if the mean errors for the user-provided answer Y are no greater than those of the reference solution Y', then a maximum grade will be determined.

In another embodiment, the fuzzy logic unit 225 implements a sliding window validation function to grade time series types of assignments. Here, the user is required to program a model that predicts future values based on previously observed values. For example, the assignment may be to forecast future temperatures in the month of February based on the past temperatures for that month. The grading engine 220 will input validated data of temperature measurements made over a time interval and expect to receive an answer Y for the subsequent time interval. For example, data for time interval to will be the input dataset (X) and the result will be for $t_1$, then data for time interval $t_1$ will be the input dataset (X) and the result will be for $t_2$; and so on. The expected answer for time interval to will be the input dataset for $t_1$. Therefore, the grading would be based on how accurate the forecast or predication model, developed by the user, predicts the dataset for $t_1$ that is part of $t_0$.

As noted above, the execution of code in each of the processing engines 230 may be performed in a secured manner. In an embodiment, the execution of such code includes vulnerability checks for, e.g., detection of viruses, malware, and the like. In addition, the code processing engine 230 is designed in such a way that even legitimate code will not be able to tamper with the grading engine, as the code provided by the user is executed only within the processing engine 230. The resulting dataset (Y) is pre-checked for validity, and a dataset that failed these checks will not be processed by the grading engine 220. For example, if the resulted dataset (Y) is an executable code, then the grading engine 220 will not process such code.

It should be noted that the program code written by a user may be in any programming or scripting language. Examples of which include JavaScript, Python, Matlab®, C, C++, C#, Java®, Scala, and the like. The submitted program code is a computer program compiled into instructions that may include code (e.g., in source code format, binary code format, executable code format, or any other suitable format of code). The instructions, when executed by a processing engine 230, cause the engine 230 to compute the answer Y.

In an embodiment, each of the authentication engine 210, the grading engine 220, and the code processing engine 230 can be realized or controlled by one or more hardware logic components and circuits. For example and without limitation, illustrative types of hardware logic components that can be used include FPGAs, ASICs, SOCs, general-purpose microprocessors, DSPs, and the like, or any other hardware logic components that can perform calculations or other manipulations of information.

Following are some non-limiting examples for the operation of the grading system 130. In a first example, the assignment to the user is to develop an algorithm that crawls a website of NY Social Diary's Party Pictures and generates an analytics graph of social connections in NY. Exemplary code for such a program would be:

```
import ujson, requests, gzip
from bs4 import BeautifulSoup
from lib.timer import Timer
from ediblepickle import checkpoint
def get_soup(url):
    requests.get(url)
    return BeautifulSoup(page.content)
def get_page link(url):
    return [BASE_URL + row.find('a').attrs['href']
        for row in
        get_soup(url).select('.links')]
def_get_page_links( ):
    return [page for k in xrange(ARCHIVE_PAGES)
        for page in get_page_link(BASE_URL +
        'party-pictures?page=%d' % k)]
def get_captions(url):
    return [x.text.strip( ) for x in get_soup(url).select
        ('.captions')]
if__name == '__main__'
    page_links = get_page_links( )
    page_text = [get_captions(url) for url in page_links]
    page_names = [cap.split( ) for cap in page_text]
    graph_edges = [pair for names in page_names
        for pair in pairwise(names)]
    print Graph(edges=graph_edges).high_degree_nodes
```

The program code is uploaded to the code repository 240 and pushed to the grading engine 220. The grading engine 220 instantiates or selects an active code processing engine 230. The program code is sent to such code processing engine 230, which compiles and executes the code. In this case, no input dataset (x) is provided. It should be noted that any compilation errors are captured by the grading engine 220 and reported to the user. The answer (Y) in this example would be a list of people which will be graded by the fuzzy logic unit 225 based on a flat tail distribution function. It should be noted that all libraries (e.g., BeautifulSoup and Timer) are automatically imported and managed by the grading system.

As another example, the assignment may be to train models on restaurant reviews that will predict restaurant popularity rating given structured (e.g., city, presence or absence of outdoor seating, cuisine type) and unstructured (e.g., free-text review data) data properties about a restaurant. To solve this assignment, the user is required to develop a machine learning model.

Exemplary program code may be:

```
latlong model = Pipeline("columns", ColumnSelect
    (["latitude", "longitude"])),
        ("estimator", KNeighborsRegressor(75))])
category_model = Pipeline([("columns",
ColumnSelect("categories")),
        ("massage", ListToDict( )),
        ("to_dict", DictVectorizer(dtype=np.bool)),
        ("linear_estimator", Ridge( ))])
attribute_model =Pipeline([("get_attributes",
```

```
ColumnSelect("attributes")),
        ("massage", AttributesToDict( )),
        ("dict_vect", DictVectorizer( )),
        ("estimator", Ridge( ))])
if__name__ =='__main__':
    print GridSearchCV(latlong_model, ...).
    fit(X, y).predict(validation)
    print GridSearchCV(category_model, ...).
    fit(X, y) .predict(validation)
    print GridSearchCV(attribute_model, ...).
    fit(X, y) .predict(validation)
```

The grading engine 230 provides an input dataset (X), which is the validation data for the model. Once the code is executed by a code processing engine 230, the answer (Y) is the prediction of the restaurant rating based on the student-trained model as applied to the validated dataset (Y). The mean error of the answer (Y) is computed using RMSE. The grading engine 230 predicts (Y') based on a test validated input dataset (X'). The test validated input dataset (X') may be the same as input dataset (X) or randomly selected from a group of test validated input datasets. In another embodiment, the selection of the test validated input datasets may be based on an identity of a user. The mean error of the expected answer (Y') is also computed using RMSE. The mean errors of Y and Y' are compared to each other to determine the grade, e.g., high grade if these errors are the same.

Another example for an assignment would be to compute statistics on the link structure and linguistic properties of Wikipedia® in different languages. In this example, there is no input dataset X and the answer Y should be computed by running MapReduce jobs. MapReduce is a programming model and an associated implementation for processing and generating large data sets with a parallel, distributed algorithm on a cluster. In an embodiment, each output (Y and Y') represents summary statistics of the linguistic distributional results. The grading is based on the difference between the expected answer (Y') and the answer (Y).

Figure 4:
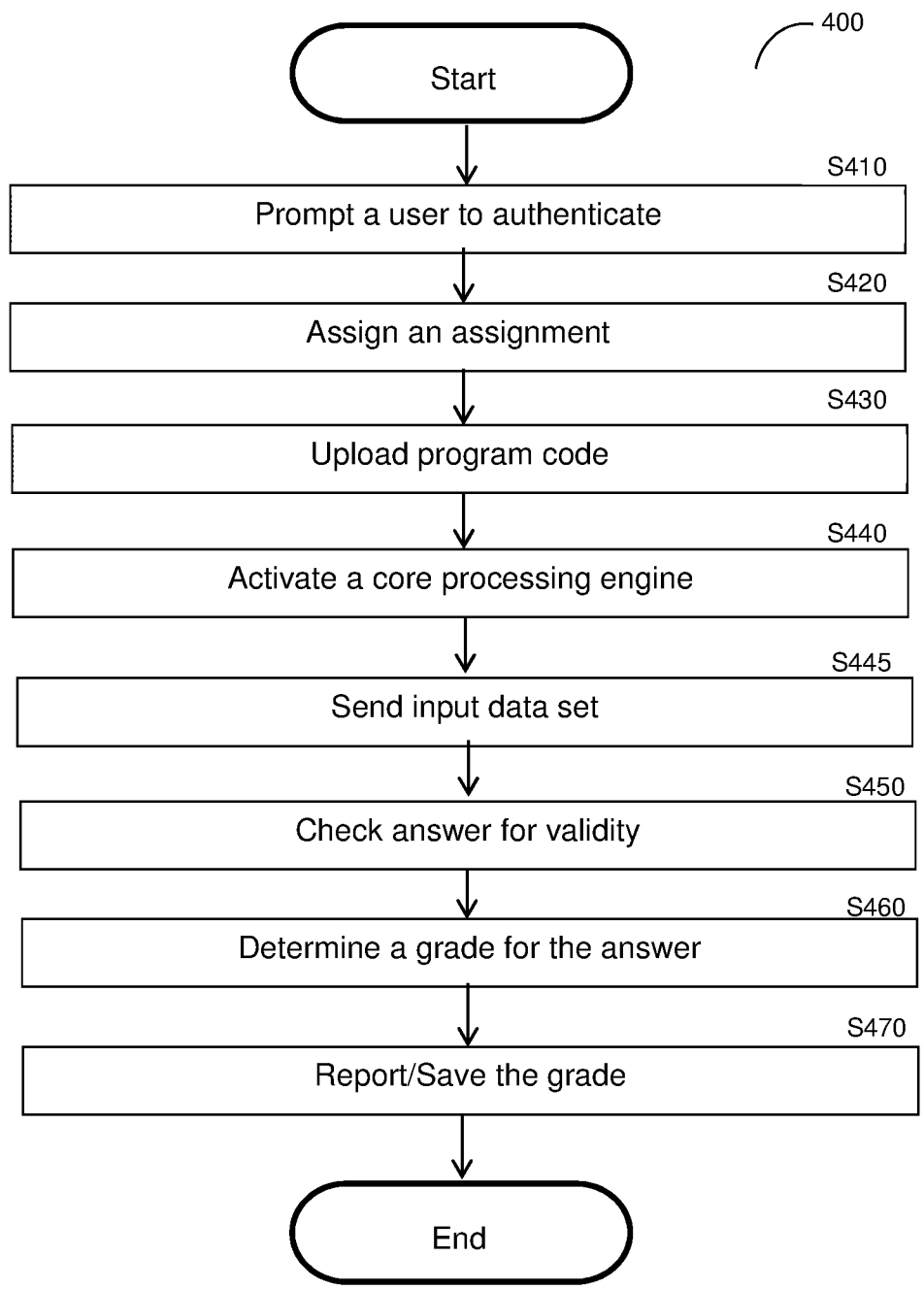
FIG. 4 is a flowchart illustrating a method for automated grading of a user solution to a computing assignment according to an embodiment.

FIG. 4 is an example flowchart 400 illustrating a method for automated grading a user solution to a computing assignment according to an embodiment. The computing assignment is at least related to the field of big data analysis. The user is required to develop a program code which implements an algorithm requiring big data analysis. It should be noted that the term "big data analysis" includes data science, data engineering, data analytics, data visualization, data management, and the like. A user includes, for example, a data engineer, a data scientist, a software engineer, or any person having programming skills.

At S410, the user is prompted to authenticate to the grading system. In an embodiment, the user is identified and authenticated via cryptographically secure keys to ensure they cannot read each other's answers and/or the master answers. At S420, upon authentication, an assignment is selected, assigned, and provided to the user. The assignment to be assigned can be selected based on the user's level and/or based on the curriculum of the course or class the user participates.

At S430, a program code written by the user is uploaded to a code repository. The program code can be assigned with a version identifier when stored in the code repository. The program code is a computer program written using high-level programming or scripting languages.

At S440, a core processing engine is activated or instantiated and the program code is sent from the code repository to such processing engine for execution therein. As noted above, the core processing engine is a secured isolated execution environment. Optionally, at S445, an input dataset (X) required as part of the code execution may be sent to the activated code processing engine.

In an embodiment, execution of the program code includes compiling of the program code to an executable code. The compilation process is monitored and detected compilation errors are reported to the user in real-time. In yet another embodiment, during the execution of the code by the core processing engine, external web sources can be accessed to retrieve information therefrom. The execution of the code by the core processing engine results with an answer (Y).

At S450, the answer (Y) is checked for validity. In an embodiment, this includes ensuring that the answer is complete and in the correct format.

At S460, a grade is determined for the answer (Y) respective of an expected answer (Y'). The grading is an approximate grading computed based on one or more of fuzzy logic functions, machine learning metrics, time series metric, and the like. As discussed above, fuzzy logic functions include commonality matching, flat tail distribution, and forgiveness grading. Example machine learning processes include root mean square error (RMSE) for mean errors, a classification function for classification errors, a recall-and-precision function for IR-models, a hold-out validation, and the like, or any combination thereof. At S470, the determined grade is reported to the user and/or saved in a database. In an embodiment, the report may be sent as immediate feedback in real-time.

It should be noted that the immediate feedback on the program code submitted allows the user to improve such code and resubmit for grading. Such submission can be assigned with a different version. The regular and instant grading feedback is critical for accelerating learning and enabling to encourage user to further improve on their assignments. As part of the regular and instant grading feedback, the grading system may assign an easier or harder assignment depending on the user performances.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for grading a user solution to a computing assignment, comprising:
   receiving a program code submitted by a user, wherein the received program code is the user solution to the computing assignment;
   activating a plurality of code execution engines, wherein each code execution engine of the plurality of code execution engines is a secured isolated execution environment;
   executing the program code in the plurality of code execution engines concurrently to produce an answer;
   determining a grade for the answer based on an expected answer and an approximate grading function, wherein the approximate grading function is determined based on a type of the computing assignment; and
   returning the grade to the user.

2. The method of claim 1, further comprising:
   authenticating the user prior to an assignment of the computing assignment to the user.

3. The method of claim 1, further comprising:
   storing the received program code in a code repository with a unique version identifier; and
   pushing the program code from the code repository to at least one code execution engine of the plurality of code execution engines.

4. The method of claim 1, further comprising:
   inputting an input dataset to at least one code execution engine of the plurality of code execution engines, wherein the answer is produced in part based on the input dataset.

5. The method of claim 1, wherein executing the program code in the plurality of code execution engines further comprises:
   checking the program code for at least syntactic correctness;
   compiling, by the plurality of code execution engines, the program code;
   determining whether at least one compilation error occurs during the compilation;
   capturing the at least one compilation error, when it is determined that the at least one compilation error occurs during the compilation; and
   reporting the captured at least one compilation error to the user.

6. The method of claim 1, further comprising:
   validating the answer, wherein the grade is only determined for the answer when the answer is validated.

7. The method of claim 1, wherein the approximate grading function is any of: a fuzzy logic function, a machine learning metric, and a time series metric.

8. The method of claim 7, wherein the fuzzy logic function includes at least one of: a commonality matching function, a flat tail distribution function, and a forgiveness grading function.

9. The method of claim 7, wherein the machine learning metric includes at least one of: a classification metric and a regression metric, wherein the regression metric includes any of: a root mean square error (RMSE), a mean absolute error, and R2, wherein the classification metric includes any of: a recall-and-precision, a F-score, an area under curve (AUC), a confusion score, and a jaccard similarity.

10. The method of claim 1, wherein the computing assignment is designed to train the user based on at least one of: machine learning; data wrangling; extracting, transforming, and loading (ETL); distributed computation and Hadoop; distributed computing with Spark®, Hive, and Scalding tools; and data visualization.

11. The method of claim 1, wherein the approximate grading of a machine learning assignment further comprises:
predicting the expected answer based on the answer and a test validated dataset, wherein the test validated dataset is randomly selected from a group of test validated datasets.

12. The method of claim 1, wherein the program code is written using any of: a programming language, and a scripting language.

13. The method of claim 1, wherein each code execution engine is any of: a virtual container, and a software container.

14. A non-transitory computer readable medium having stored thereon instructions for causing one or more processing units to execute the method according to claim 1.

15. A grading system for grading a user solution to a computing assignment, comprising:
a processing system; and
a memory, the memory containing instructions that, when executed by the processing system, configure the processing system to:
receive a program code submitted by a user, wherein the received program code is the user solution to the computing assignment;
activate a plurality of code execution engines, wherein each code execution engine of the plurality of code execution engines is a secured isolated execution environment;
execute the program code in the plurality of code execution engines concurrently to produce an answer;
determine a grade for the answer based on an expected answer and an approximate grading function, wherein the approximate grading function is determined based on a type of the computing assignment; and
return the grade to the user.

16. The grading system of claim 15, wherein the grading system is further configured to:
authenticate the user prior to an assignment of the computing assignment to the user.

17. The grading system of claim 15, wherein the grading system is further configured to:
store the received program code in a code repository with a unique version identifier; and
push the program code from the code repository to at least one code execution engine of the plurality of code execution engines.

18. The grading system of claim 15, wherein the grading system is further configured to:
input an input dataset to at least one code execution engine of the plurality of code execution engines, wherein the answer is produced in part based on the input dataset.

19. The grading system of claim 15, wherein the grading system is further configured to:
check the program code for at least syntactic correctness;
compile, by the plurality of code execution engines, the program code;
determine whether at least one compilation error occurs during the compilation;
capture the at least one compilation error, when it is determined that the at least one compilation error occurs during the compilation; and
report the captured at least one compilation error to the user.

20. The grading system of claim 15, wherein the grading system is further configured to:
validate the answer, wherein the grade is only determined for the answer when the answer is validated.

21. The grading system of claim 15, wherein the approximate grading function is any of: a fuzzy logic function, a machine learning metric, and a time series metric.

22. The grading system of claim 21, wherein the fuzzy logic function includes at least one of: a commonality matching function, a flat tail distribution function, and a forgiveness grading function.

23. The grading system of claim 22, wherein the machine learning metric includes at least one of: a classification metric and a regression metric, wherein the regression metric includes any of: a root mean square error (RMSE), a mean absolute error, and R2, wherein the classification metric includes any of: a recall-and-precision, a F-score, an area under curve (AUC), a confusion score, and a jaccard similarity.

24. The grading system of claim 15, wherein the computing assignment is designed to train the user based on at least one of: machine learning; data wrangling; extracting, transforming, and loading (ETL); distributed computation and Hadoop; distributed computing with Spark®, HIVE, and Scalding tools; and data visualization.

25. The grading system of claim 15, wherein the grading system is further configured to approximate grading of a machine learning assignment by predicting the expected answer using the answer and a test validated dataset, wherein the test validated dataset is randomly selected from a group of test validated datasets.

26. The grading system claim 15, wherein the program code is written using any of: a programming language, and a scripting language.

27. The grading system of claim 15, wherein each code execution engine is any of: a virtual container, and a software container.

* * * * *